United States Patent
Webman et al.

(10) Patent No.: US 8,290,899 B2
(45) Date of Patent: Oct. 16, 2012

(54) GROUP STAMPING STYLE ASYNCHRONOUS REPLICATION UTILIZING A LOOSELY-ACCURATE GLOBAL CLOCK

(75) Inventors: Erez Webman, Petach-Tikva (IL); Danit Segev, Haifa (IL); Yigal Eisinger, D.N. Drom Ramat Hagolan (IL)

(73) Assignee: NetApp, Inc., Sunnyvale, CA (US)

( * ) Notice: Subject to any disclaimer, the term of this patent is extended or adjusted under 35 U.S.C. 154(b) by 1160 days.

(21) Appl. No.: 11/692,683

(22) Filed: Mar. 28, 2007

(65) Prior Publication Data

US 2008/0243952 A1 Oct. 2, 2008

(51) Int. Cl.
*G06F 7/00* (2006.01)
*G06F 17/00* (2006.01)

(52) U.S. Cl. ........ 707/610; 707/615; 707/616; 707/626; 709/248

(58) Field of Classification Search .................. None
See application file for complete search history.

(56) References Cited

U.S. PATENT DOCUMENTS

| | | | |
|---|---|---|---|
| 5,504,861 A | 4/1996 | Crockett et al. | |
| 5,592,618 A | 1/1997 | Micka et al. | |
| 5,657,440 A | 8/1997 | Micka et al. | |
| 5,682,513 A | 10/1997 | Candelaria et al. | |
| 6,144,999 A | 11/2000 | Khalidi et al. | |
| 6,502,205 B1 | 12/2002 | Yanai et al. | |
| 6,842,825 B2 * | 1/2005 | Geiner et al. | 711/133 |
| 6,993,539 B2 | 1/2006 | Federwisch et al. | |
| 7,028,147 B2 | 4/2006 | Wu et al. | |
| 7,152,977 B2 | 12/2006 | Veitch et al. | |
| 7,203,732 B2 * | 4/2007 | McCabe et al. | 709/217 |
| 7,237,076 B2 | 6/2007 | Nakano et al. | |
| 7,243,115 B2 | 7/2007 | Manley et al. | |
| 7,302,634 B2 * | 11/2007 | Lucovsky et al. | 715/200 |
| 7,325,109 B1 | 1/2008 | Muppalaneni et al. | |
| 7,467,265 B1 * | 12/2008 | Tawri et al. | 711/161 |
| 7,571,268 B2 * | 8/2009 | Kern et al. | 710/74 |
| 7,606,841 B1 | 10/2009 | Ranade | |
| 7,624,109 B2 * | 11/2009 | Testardi | 1/1 |
| 7,653,668 B1 | 1/2010 | Shelat et al. | |
| 7,885,923 B1 | 2/2011 | Tawri et al. | |

(Continued)

FOREIGN PATENT DOCUMENTS

EP    1617330 A2    1/2006

OTHER PUBLICATIONS

Birman et al, "Lightweight Causal and Atomic Group Multicast" ACM Transactions on Computer Systems, vol. 9, No. 3, Aug. 1991, pp. 272-314.*

(Continued)

*Primary Examiner* — Angelica Ruiz
(74) *Attorney, Agent, or Firm* — Cesari and McKenna, LLP

(57) ABSTRACT

A group stamping style asynchronous replication service utilizes a loosely-accurate global clock in a data backup and recovery storage environment. The storage environment includes a set of source storage systems illustratively embodied as source replication nodes that cooperate to maintain a consistency group that may span multiple geographical sites. The storage environment also includes one or more target storage systems illustratively embodied as target replication nodes configured to service the consistency group. The group stamping style service utilizes the loosely-accurate global clock to provide consistent replication of a storage space, e.g., a target storage space, of the consistency group.

19 Claims, 7 Drawing Sheets

U.S. PATENT DOCUMENTS

| | | |
|---|---|---|
| 2002/0039370 A1 | 4/2002 | Elliot |
| 2003/0018878 A1 | 1/2003 | Dorward et al. |
| 2003/0101223 A1* | 5/2003 | Pace et al. .................. 709/206 |
| 2003/0182313 A1 | 9/2003 | Federwisch et al. |
| 2003/0204692 A1 | 10/2003 | Tamer et al. |
| 2004/0030703 A1* | 2/2004 | Bourbonnais et al. ........ 707/100 |
| 2004/0030837 A1* | 2/2004 | Geiner et al. ................ 711/133 |
| 2004/0139367 A1 | 7/2004 | Boyd et al. |
| 2004/0250029 A1 | 12/2004 | Ji et al. |
| 2004/0260736 A1 | 12/2004 | Kern et al. |
| 2005/0071708 A1 | 3/2005 | Bartfai et al. |
| 2005/0144202 A1 | 6/2005 | Chen |
| 2005/0154786 A1 | 7/2005 | Shackelford |
| 2006/0015507 A1 | 1/2006 | Butterworth et al. |
| 2006/0059322 A1 | 3/2006 | Poston |
| 2006/0095480 A1 | 5/2006 | Vaughn et al. |
| 2006/0106895 A1 | 5/2006 | Vaughn et al. |
| 2007/0011281 A1* | 1/2007 | Jhoney et al. ................ 709/220 |
| 2007/0022264 A1 | 1/2007 | Bromling et al. |
| 2007/0094466 A1* | 4/2007 | Sharma et al. ............... 711/162 |
| 2007/0118687 A1* | 5/2007 | McGovern et al. ........... 711/112 |
| 2007/0165549 A1 | 7/2007 | Surek et al. |
| 2007/0185937 A1 | 8/2007 | Prahlad et al. |
| 2007/0185938 A1 | 8/2007 | Prahlad et al. |
| 2007/0208790 A1* | 9/2007 | Reuter et al. ................. 707/206 |
| 2007/0208839 A1* | 9/2007 | Voigt et al. ................... 709/223 |
| 2007/0214194 A1* | 9/2007 | Reuter ......................... 707/204 |
| 2007/0239950 A1* | 10/2007 | Kern et al. ................... 711/162 |
| 2007/0288708 A1 | 12/2007 | Saha et al. |
| 2008/0162594 A1 | 7/2008 | Poston |
| 2008/0243951 A1 | 10/2008 | Webman et al. |
| 2010/0169275 A1 | 7/2010 | Chen et al. |
| 2010/0250497 A1 | 9/2010 | Redlich et al. |

OTHER PUBLICATIONS

"Notification of Transmittal of the International Search Report and the Written Opinion of the International Searching Authority, or the Declaration," International Filing Date: Mar. 19, 2008, International Application No. PCT/US2008/003554, Applicant: Network Applicance, Inc., Date of Mailing: Aug. 26, 2008, pp. 1-14.

Mills, Davis L., "Network Time Protocol (version 3) Specification, Implementation and Analysis," Network Working Group, XP 002935527, Mar. 1, 1992, pp. i-viii and 1-113.

"Notification of Transmittal of the International Search Report and the Written Opinion of the International Searching Authority, or the Declaration," International Filing Date: Mar. 20, 2008, International Application No. PCT/US2008/003692, Applicant: Network Appliance, Inc., Date of Mailing: Nov. 5, 2008, pp. 1-17.

"Notification of Transmittal of the International Search Report and the Written Opinion of the International Searching Authority, or the Declaration," International Filing Date: Mar. 19, 2008, International Application No. PCT/US2008/003612, Applicant: Network Appliance, Inc., Date of Mailing: Nov. 5, 2008, pp. 1-17.

* cited by examiner

GROUP STAMPING STYLE ASYNCHRONOUS REPLICATION UTILIZING A LOOSELY-ACCURATE GLOBAL CLOCK

CROSS-REFERENCE TO RELATED APPLICATION

The present invention is related to the following commonly assigned U.S. patent application Ser. No. 11/692,659 titled Advanced Clock Synchronization Technique, which was published on Oct. 2, 2008 as Patent Publication No. 2008/0243950, and U.S. patent application Ser. No. 11/692,668 titled Write Ordering Style Asynchronous Replication Utilizing a Loosely-Accurate Global Clock, which was published on Oct. 2, 2006 as Patent Publication No. 2008/0243951, each of which was filed on Mar. 28, 2007.

FIELD OF THE INVENTION

The present invention relates to replication services and, more specifically, to a group stamping style asynchronous replication service utilizing a loosely-accurate global clock.

BACKGROUND OF THE INVENTION

Replication is typically employed as part of a data backup and recovery storage strategy and, as such, denotes the movement of data from a source storage space of a source domain to a target storage space of a target domain via a communications network (e.g., a computer network) in such a way that enables recovery of applications from the target storage space. As used herein, recovery denotes loading of the applications on possibly different hosts (e.g., computers) where they can access the target storage space, instead of the source storage space, resulting in the applications loaded to a valid state. Also, storage space denotes any storage medium having addresses that enable data to be accessed in a stable way and, as such, may apply to file system access, block access and any other storage access means.

The source domain contains at least the source storage space, but may also contain the hosts, a switching fabric and any source replication components situated outside of those components. In this context, a component may either be a physical entity (e.g., a special replication appliance) and/or software entity (e.g., a device driver). In remote disaster recovery, for example, the source domain includes an entire geographical site, but may likewise span multiple geographical sites. The target domain includes all of the remaining components relevant for replication services, including the target storage space. In addition, a replication facility includes components that may be located in both the source and target domains.

The replication facility typically has at least one component, i.e., a write interception component, which intercepts storage requests (e.g., write operations or "writes") issued by a host to the source storage space, prior to sending the intercepted writes to the target storage space. The write interception component is typically embedded within a computing unit configured as a source replication node. When issuing a write, an application executing on the host specifies an address on the storage space, as well as the contents (i.e., write data) with which the storage space address is to be set. The write interception component may be implemented in various locations in the source domain depending on the actual replication service; such implementations may include, e.g., a device driver in the host, logic in the switching fabric, and a component within the source domain, e.g., a source storage system. The write interception component is typically located "in-band", e.g., between the host and the source storage system, although there are environments in which the component may be located "out-of-band", where a separate physical component, such as an appliance server, in the source domain receives duplicate writes by utilizing, e.g., an in-band splitter.

Synchronous replication is a replication service wherein a write is not acknowledged until the write data associated with the write is processed by the source storage space, propagated to the target domain and persistently stored on the target storage space. An advantage of synchronous replication is the currency of the target domain data; that is, at any point in time, the writes stored on the target domain are identical to the source domain. However a disadvantage of this replication service is the latency or propagation delay associated with communicating the writes to the target domain, which limits the synchronous replication service in terms of distance, performance and scalability.

An asynchronous replication service reduces such latency by requiring that the write only be processed by the source storage space without having to wait for persistent storage of the write on the target storage space. In other words, the write is acknowledged once its associated write data is processed by the source storage space; afterwards, the write (and write data) are propagated to the target domain. Thus, this replication service is not limited by distance, performance or scalability and, therefore, is often preferred over synchronous replication services. A disadvantage of the asynchronous replication service, though, is the possibility of incurring data loss should the source storage space fail before the write data has been propagated and stored on the target storage space.

Prior asynchronous replication services may be classified into a plurality of techniques or styles, one of which is group stamping. According to this replication style, the write interception component intercepts all writes (e.g., synchronously before an acknowledgement is returned to the application) and buffers the intercepted writes. Instead of attempting to establish a relative order among all the writes, the group stamping style service establishes an interval, e.g., either in time or by trigger, and all writes that are intercepted by the write interception component within the interval are recorded to a current group of writes. Notably, the current group is defined by buffering writes during the established interval and associating metadata with the entire group without the need to associate the metadata with each write. The metadata may be an actual timestamp or, more likely, a timeless ordering mechanism (e.g., a sequence number).

Thereafter, according to a predetermined policy or other conditions, the write interception component declares the current group completed and records all subsequent writes to a newly established group. The current group of writes is propagated to the target domain and persistently buffered therein prior to being applied to the target storage space. The group stamping style is typically employed by asynchronous replication services because of its lack of concern with the actual order of writes within an interval; group stamping is generally only concerned with the fact that the writes belong to a same interval.

The replication services may be further adapted to planned recovery or unplanned recovery. Planned recovery is defined herein as an act of recovery where components, e.g., hardware and software, of the source domain are fully operational, whereas unplanned recovery is defined as recovery that takes place when the source components are fully and/or partially non-operational. As used herein, the source domain describes all of the components whose failure/unavailability should not impair the ability to do unplanned recovery.

For unplanned recovery services utilizing the group stamping style, an entire group of writes is propagated to the target domain for storage on the target storage space in a manner that ensures consistency in light of an intervening disaster. For example, the writes are propagated to an intermediate staging area on the target domain to ensure that the target storage space can be "rolled back" to a consistent state if a disaster occurs. The replication services may utilize various intermediate staging areas (such as a persistent log or non-volatile memory) to buffer the writes in a safe and reliable manner on the target domain. In some cases, the intermediate staging area is the target storage space itself and consistent snapshots of, e.g., target volumes of the storage space are generated. In the event of a disaster, a snapshot of the target volume(s) is used rather than the "current" content of the target volume(s).

Assume a group stamping replication service utilizes one write interception component. A first interval is started and a first group of writes is intercepted and logged by the write interception component until the first interval completes. A second interval is then started and a second group of writes is intercepted and logged by the interception component. Meanwhile, the component propagates the first group of writes to a target storage system of a target domain. Where there are two or more writes directed to the same block (address) within the same interval, the write interception component may remove the duplication and send only the most up-to-date write to the target domain (in accordance with a data reduction replication technique). However, if a replication service is implemented that does not reduce such duplication, the write interception component propagates the writes to the target domain in the respective order using, for example, an in-order log or journal on the source domain.

A disadvantage of group stamping is that the achievable Recovery Point Objective (RPO) in the case of disaster may never approach zero because of the delay incurred by the writes at the interception component as a result of the interval. As used herein, RPO is defined as the difference (in time) between the time of a disaster and the time at which the source storage space contained a crash image established at the target storage space. For example, assume the smallest interval of a group stamping style replication service is 10 minutes. If a disaster occurs, the target domain is, on average, 5 minutes behind because the disaster does not necessarily occur exactly before the interval completes. Note that it may be impractical to develop a group stamping replication solution with very small intervals.

Often, a source domain configuration having multiple hosts and/or multiple source storage systems may include only one source replication node (i.e., one write interception component) configured to intercept all writes associated with a consistency group. As used herein, a consistency group comprises storage space that requires consistent replication at a target domain. Such a configuration introduces a scalability issue because there is a limit to the processing bandwidth that the interception component can sustain, thereby resulting in potentially substantial adverse impact on performance of the entire configuration. Thus, this configuration may obviate use of a single write interception component.

For example, assume that a large data center is configured with many source storage systems configured to serve many hosts, wherein the source storage systems cooperate to maintain a consistency group. If all write traffic is directed to the single write interception component, a substantial scalability issue arises because the interception component will not practically be able to sustain the entire traffic. Now assume that a consistency group is configured to span multiple geographical site locations such as, e.g., among several small data centers geographically dispersed throughout a country or a plurality of countries. Here, the main reason for not using a single write interception component is not necessarily the scalability issue as much as the substantial latency introduced by such a configuration. This may necessitate either use of smaller consistency groups, which facilitates reliable and consistent group recovery on the target domain, or acceptance of large latencies and performance impact, which is undesirable. Therefore, such configurations may dictate the use of multiple write interception components.

A prior solution provides consistent replication services using group stamping across multiple write interception components through coordination among all write interception components. Here, a coordinator is provided that sends a predetermined message (e.g., a freeze message) to all write interception components when it is desired to complete a previous interval N. Note that the components accumulate writes in a journal, and process (and acknowledge) those writes beginning at the start of the previous interval N. Upon receiving the freeze message, a write interception component "quiesces" all new write activity by, e.g., buffering any new incoming writes without processing or acknowledging those writes. The coordinator then waits until all write interception components respond with freeze acknowledgements. Once the freeze acknowledgments are received from all the write interception components, the coordinator sends a thaw message to each component to thereby start a new interval N+1. In response, the new, buffered incoming writes are processed by the write interception components as part of the new interval.

The writes of interval N are then propagated from each write interception component to the target domain. Depending on the actual implementation, the writes of interval N may be differentiated among the components such as, e.g., interval $N_1$ from write interception component 1, interval $N_2$ from write interception component 2, etc. Only after all of the writes of interval N are propagated from all of the write interception components to the target domain is the target domain allowed to start applying them to the target storage space. In order to perform consistent group stamping, the write interception components are typically architected in "shared-nothing" relationships (i.e., between write interception components and storage) to obviate crossing of writes received at different write interception components.

A disadvantage of group stamping across multiple write interception components is that the quiescent penalty is substantial in terms of performance. In particular, the freeze-thaw protocol exchange between a coordinator and a plurality of write interception components is not scalable; i.e., the weakest/slowest point in the coordinator-component interchange sequence dominates. This is because the coordinator has to wait to receive every acknowledgement from every write interception component before the previous interval can conclude and a new interval can start, thereby imposing a potential global penalty for all writes issued by the hosts to the source storage systems. This disadvantage may require placing of restrictions on the locations of the write interception components. For example, the group stamping style approach may be reasonable if the write interception components are placed inside of the source storage systems because (i) there are fewer of these systems then hosts, (ii) the source storage systems are typically not located far from each other and (iii) such an arrangement enables more control over the behavior of the components.

Yet another problem that limits scalability of group stamping across multiple write interception components is when a write interception component does not respond to the freeze-thaw protocol. In such a situation, the coordinator is stalled and cannot progress until all acknowledgments are received from all components. In addition, implementation of recovery procedures associated with such a situation (such as timeouts, etc) may be complex.

SUMMARY OF THE INVENTION

The present invention overcomes the disadvantages of the prior art by providing a group stamping style asynchronous replication service that utilizes a loosely-accurate global clock in a data backup and recovery storage environment. The storage environment includes a set of source storage systems illustratively embodied as source replication nodes that cooperate to maintain a consistency group that may span multiple geographical sites. The storage environment also includes one or more target storage systems illustratively embodied as target replication nodes configured to service the consistency group. The group stamping style service utilizes the loosely-accurate global clock to provide consistent replication on a storage space, e.g., a target storage space, of the consistency group.

In an illustrative embodiment, each source replication node comprises a write interception component adapted to intercept storage requests (e.g., write operations or "writes") and replicate those writes to the target replication nodes for storage on the consistency group. Each target replication node comprises a log, a consistency engine and an apply engine. The write interception component of each source replication node establishes an interval whereby all intercepted writes within the interval are recorded to a current group of writes. The current group is defined by buffering writes during the established interval and associating metadata with the entire group, wherein the metadata illustratively includes a Time Identifier (ID). The write interception component buffers the writes, their associated write data and the metadata of the group as an entry of a buffer and then propagates its buffered entry to the target replication node, which stores the entry as a buffered log entry in the log.

In accordance with the invention, the consistency engine is configured to establish, maintain and advance a consistency timeline. Only log entries that have an associated Time ID earlier than a current consistency timeline may be applied to the target storage space by the apply engine. The apply engine is thus configured to apply all log entries up to a given consistency timeline to thereby create a crash image on the target storage space, wherein the crash image is a storage image of the target storage space that is available at restart from an interruption, such as a power failure.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
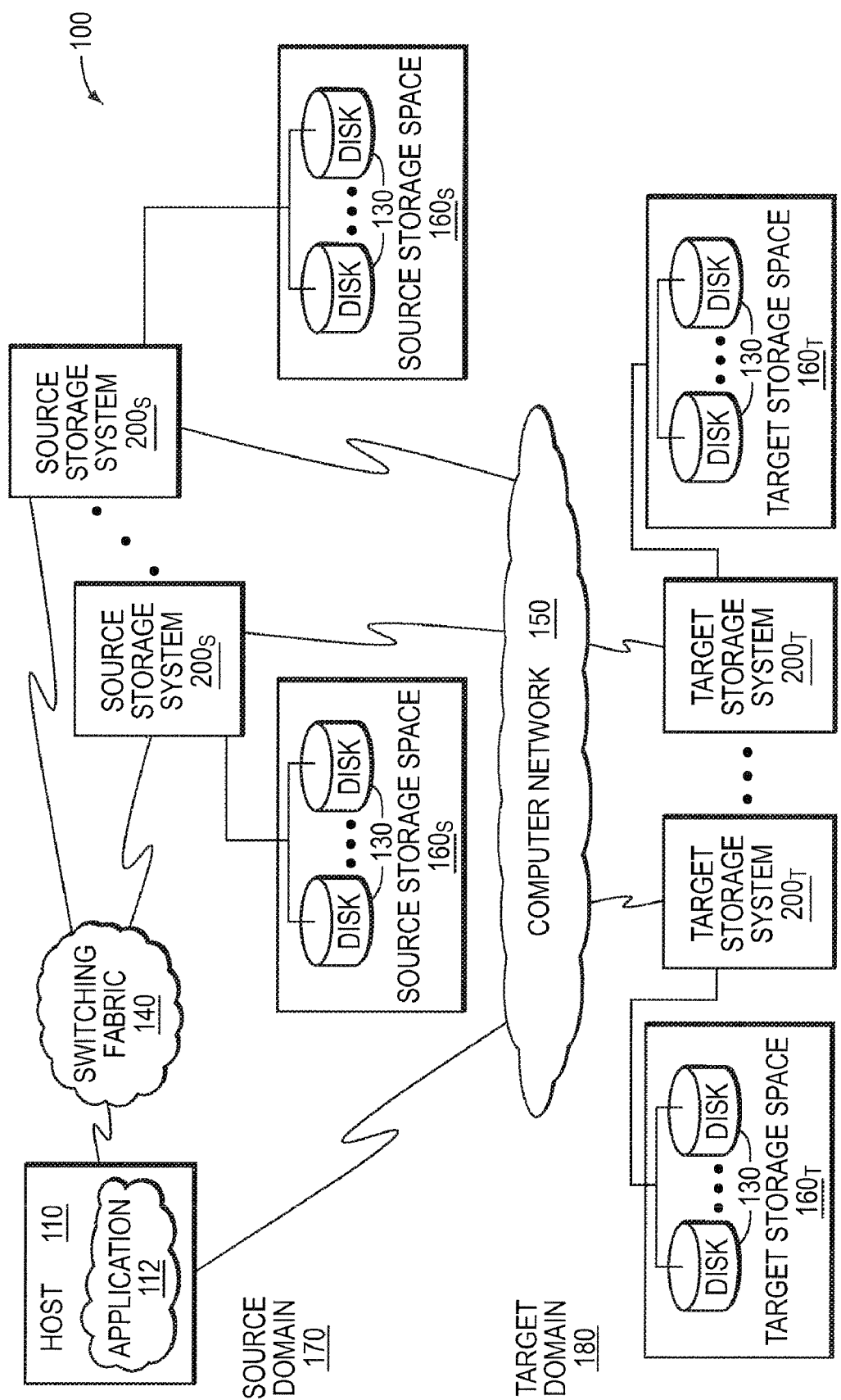
FIG. 1 is a schematic block diagram of an environment including a plurality of storage systems that may be advantageously used with the present invention.

FIG. 1 is a schematic block diagram of an environment 100, such as a data backup and recovery storage environment, which includes a plurality of storage systems 200, such as source storage systems $200_S$ and target storage systems $200_T$, that may be advantageously used with the present invention. Each storage system is a computer that provides storage service relating to the organization of information on storage devices, such as disks 130. The disks 130 of each storage system $200_{S,T}$ cooperate to define a storage space $160_{S,T}$ on each system. The source storage systems are connected to one or more hosts 110 over a switching fabric 140, which may comprise a conventional Ethernet or Fibre Channel (FC) switch.

In an illustrative embodiment described herein, the hosts 110, source storage systems $200_S$ and source storage spaces $160_S$ are organized as components of a source domain 170, while the target storage systems $200_T$ and their target storage spaces $160_T$ are organized as components of a target domain 180. The source domain components are coupled to the target domain components over a computer network 150, which may comprise a plurality of point-to-point connections or communication links of, e.g., a wide area network embodied as an Ethernet network or a FC network. The components of each domain may communicate over network 150 by exchanging discrete frames or packets of data according to pre-defined protocols, such as the Transmission Control Protocol/Internet Protocol (TCP/IP).

Each host 110 may be a general-purpose computer configured to execute applications 112. Moreover, each host 110 may interact with each storage system 200 in accordance with a client/server model of information delivery. That is, the client (host) may request the services of the server (storage system), and the storage system may return the results of the services requested by the host, by exchanging packets over, e.g., the switching fabric 140. The hosts may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over FC (FCP), when accessing information in the form of blocks.

Figure 2:
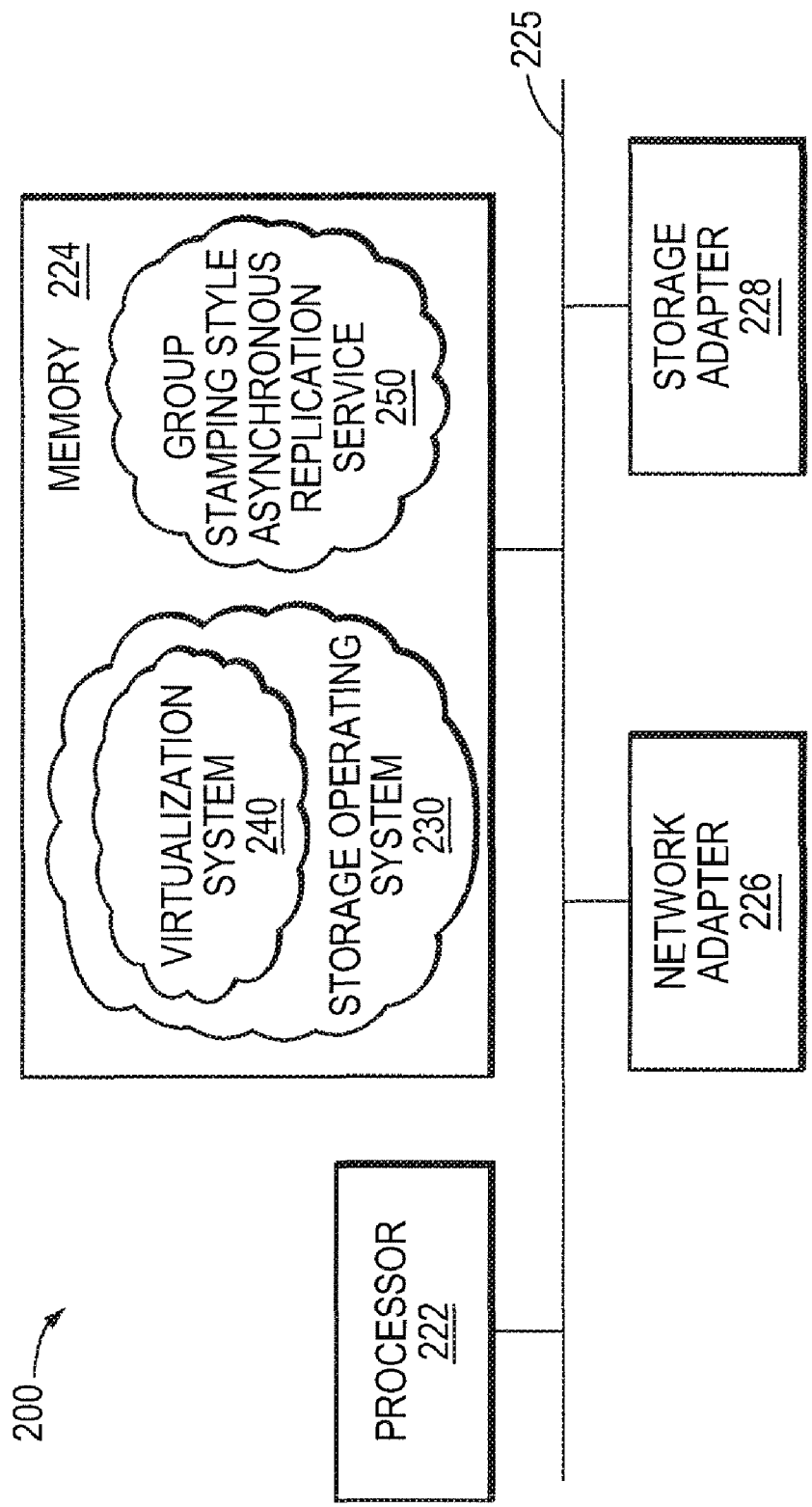
FIG. 2 is a schematic block diagram of a storage system that may be advantageously used with the present invention.

FIG. 2 is a schematic block diagram of a storage system 200 that may be advantageously used with one or more embodiments described herein as, e.g., a source storage system $200_S$ or target storage system $200_T$. Each storage system 200 comprises a processor 222, a memory 224, a network adapter 226 and a storage adapter 228 interconnected by a system bus 225. The network adapter 226 comprises the mechanical, electrical and signaling circuitry needed to connect the storage system 200 to the switching fabric 140 or computer network 150. The storage system 200 also includes a storage operating system 230 that preferably implements a virtualization system 240 to logically organize the information as a hierarchical structure of data containers, such as directories, files and logical units (luns). The virtualization system may be abstracted through the use of a database management system, a volume manager or, as described herein, a file system.

In an illustrative embodiment, the memory 224 comprises storage locations that are addressable by the processor and adapters for storing software programs and data structures associated with the present invention. The processor and adapters may, in turn, comprise processing elements and/or logic adapted to execute the software programs and manipulate the data structures. Storage operating system 230, portions of which is typically resident in memory and executed by the processing elements, functionally organizes the system 200 by, inter alia, invoking storage operations in support of processes, modules and/or services executing on the storage system. These processes, modules and/or services may include replication services such as, e.g., group stamping style asynchronous replication service 250. It will be apparent to those skilled in the art that other processing and memory means, including various computer readable media, may be used to store and execute program instructions pertaining to the inventive technique described herein.

The storage adapter 228 cooperates with the storage operating system 230 executing on the system 200 to access information requested by a host (or user). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130. The storage adapter includes input/output (I/O) interface circuitry that couples to the disks over an I/O interconnect arrangement, such as a conventional high-performance, FC serial link topology.

Storage of information on each storage system $200_{S,T}$ is preferably implemented as a collection of physical storage disks 130 cooperating to define an overall logical arrangement of storage space $160_{S,T}$ on the system. To facilitate access to the disks 130, the storage operating system 230 implements a file system that cooperates with virtualization modules to provide virtualization system 240 that "virtualizes" the storage space 160 provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named luns.

In an illustrative embodiment, application 112 executes in host 110 to issue storage requests to access data containers exported by source storage systems $200_S$ of the source domain 170. The virtualization system 240 of each source storage system transposes the storage requests into file system requests for local storage on the source storage space $160_S$, to thereby serve the storage requests issued by the host 110. The storage requests are illustratively write operations ("writes"). A write interception entity or component intercepts the writes and replicates those writes to one or more target storage systems $200_T$ of the target domain 180, where the intercepted writes are stored for, e.g., data backup and/or disaster recovery purposes. The writes are thereafter consistently stored on the target storage space $160_T$ such that, if a disaster arises, the storage on that storage space can be recovered in a manner that maintains the order of writes issued to the source storage systems by the host.

The write interception component may reside (i) in the host 110 (e.g., embodied as a device driver), (ii) within the switching fabric 140 (e.g., embodied as a software module in the network switch) or, as described herein, (iii) in the source storage system $200_S$, such that the component may intercept the writes in block-level or file-level semantics. A source replication node is the computing unit in which the write interception component is embedded. For example, if the write interception component is implemented as a device driver inside host 110, the host is the source replication node, whereas if the component is located out-of-band, i.e., within an appliance server, the appliance server is the source replication node.

An advanced clock synchronization technique is adapted for use with replication service 250 in the data backup and recovery storage environment 100. The advanced clock synchronization technique establishes a software-only, loosely-accurate global clock based on a timestamp and an associated error boundary. The established clock is a loosely-accurate global clock because it is difficult to establish an extremely accurate, fined-grain global clock using general-purpose host systems and commercially-available storage systems, particularly if these systems are geographically dispersed. Notably, the timestamp and its error boundary are used as global clock information to enable synchronization (i.e., ordering of storage requests) among a plurality of source replication nodes, thereby ensuring consistent replication of the storage requests on the target storage systems. An example of a loosely-accurate global clock that may be advantageously used with the present invention is disclosed in commonly-assigned U.S. patent application Ser. No. 11/692,659 titled, Advanced Clock Synchronization Technique, which application is hereby incorporated by reference.

Figure 3:
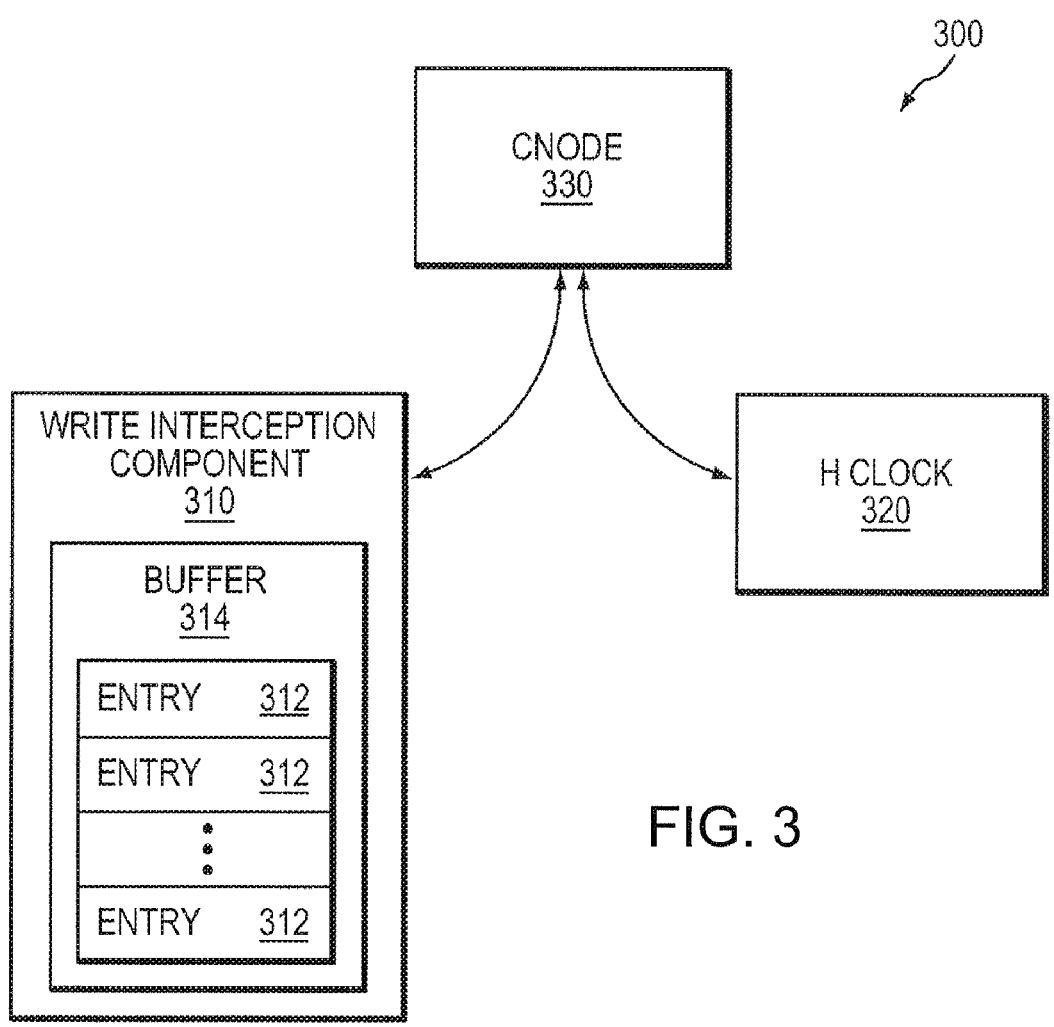
FIG. 3 is a schematic block diagram of a source replication node that may be advantageously used with the present invention.

FIG. 3 is a schematic block diagram of a source replication node 300 that may be advantageously used with the present invention. As noted, a source replication node (SRN) is the computing unit in which a write interception component is embedded. In an illustrative embodiment described herein, the write interception component 310 is located in a source storage system $200_S$ and is embodied as a software module disposed over the virtualization system 240; as such, each source storage system $200_S$ may illustratively be an SRN 300. Each SRN also contains a hardware clock (HClock) component 320 and a clock node (CNode) component 330.

Specifically, the HClock 320 is a conventional hardware clock circuit adapted to generate a clock or "timestamp" having a known drift as specified by a manufacturer, e.g., the timestamp drifts a predetermined number of seconds in an hour or in a day, maximum. Thus, there is an error boundary defined by the maximum drift, wherein the term "drift" denotes the time that the timestamp drifts from an actual, real time. The CNode 330 is coupled in cooperating relation to (associated with) the HClock 320 and the write interception component 310. The CNode 330 is illustratively a software module configured to interact collectively with other CNodes 330 of other SRNs 300 to maintain a global clock and to provide an interface to the write interception component 310 to retrieve the current time.

In an illustrative embodiment, a set of CNodes that maintains a global clock comprises a clock group and the CNodes of a set of SRNs that maintains a consistency group belong to the same clock group. One CNode from among the clock group assumes a role of a master (hereinafter "master SRN") and the other CNodes assume the roles of slaves (hereinafter "slave SRNs"). Selection of the master and slave SRNs may be performed using conventional techniques known to those skilled in the art. In addition, determination of when a master SRN should be replaced may be performed using well-known techniques. Although the master SRN (CNode) is illustratively described as contained within an SRN, it will be understood to those of skill in the art that the master CNode could also be contained within a separate computing unit exclusive of an SRN having write interception functionality.

The present invention is directed to a group stamping style asynchronous replication service that utilizes a loosely-accurate global clock in a data backup and recovery storage environment. The storage environment includes a set of source storage systems illustratively embodied as SRNs that cooperate to maintain a consistency group that may span multiple geographical sites. The storage environment also includes one or more target storage systems illustratively embodied as target replication nodes configured to service the consistency group. A target replication node is a computing unit that resides in a target domain and that receives all writes for the consistency group issued from one or more SRNs. The group stamping style service utilizes the loosely-accurate global clock to provide consistent replication on a storage space, e.g., a target storage space, of the consistency group.

Figure 4:
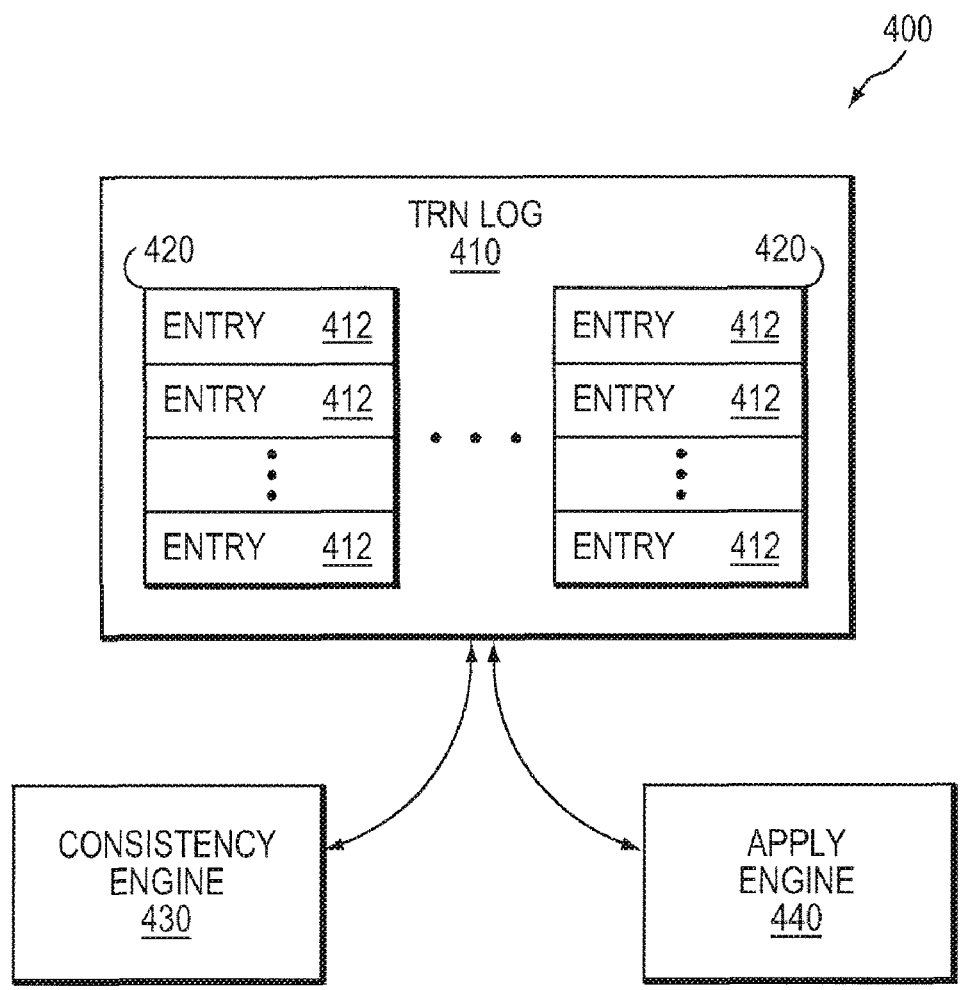
FIG. 4 is a schematic block diagram of a target replication node that may be advantageously used with the present invention.

Although an illustrative embodiment described herein is directed to a single consistency group, it will be understood to those skilled in the art that the invention may apply equally to multiple consistency groups. In addition, although the illustrative embodiment description is directed to a single computing unit, e.g., a target replication node, residing in the target domain 180 that receives all writes for the consistency group maintained by one or more SRNs, the invention applies equally to multiple target replication nodes. FIG. 4 is a schematic block diagram of a target replication node (TRN) 400 that may be advantageously used with the present invention. In an illustrative embodiment described herein, each target storage system $200_T$ may illustratively be a TRN 400. As described herein, each TRN 400 comprises a log, e.g., TRN log 410 having a plurality of log entries 412, a consistency engine 430 and an apply engine 440.

The write interception component 310 of each SRN 300 establishes an interval whereby all intercepted writes within the interval are recorded to a current group of writes, i.e., Group N. The current Group N is defined by buffering writes during the established interval and associating a timestamp with the entire group. To that end, the write interception component 310 queries (requests) its associated CNode 330 for an indication of the current time so that it can time stamp the current Group N. In response, the CNode 330 generates (prepares) and returns a Time Identifier (ID) data structure configured to describe the current time. The write interception component 310 generates metadata for the recorded group of writes, wherein the metadata illustratively includes the contents of the Time ID structure, as well as addresses of the writes within the group, etc. The write interception component buffers the writes, their associated write data and the metadata of the Group N as an entry 312 of a temporary storage location organized as, e.g., a buffer 314. Note that various replication services, such as replication service 250, may implement the buffer in various ways, e.g., using volatile or non-volatile storage.

Figure 5:
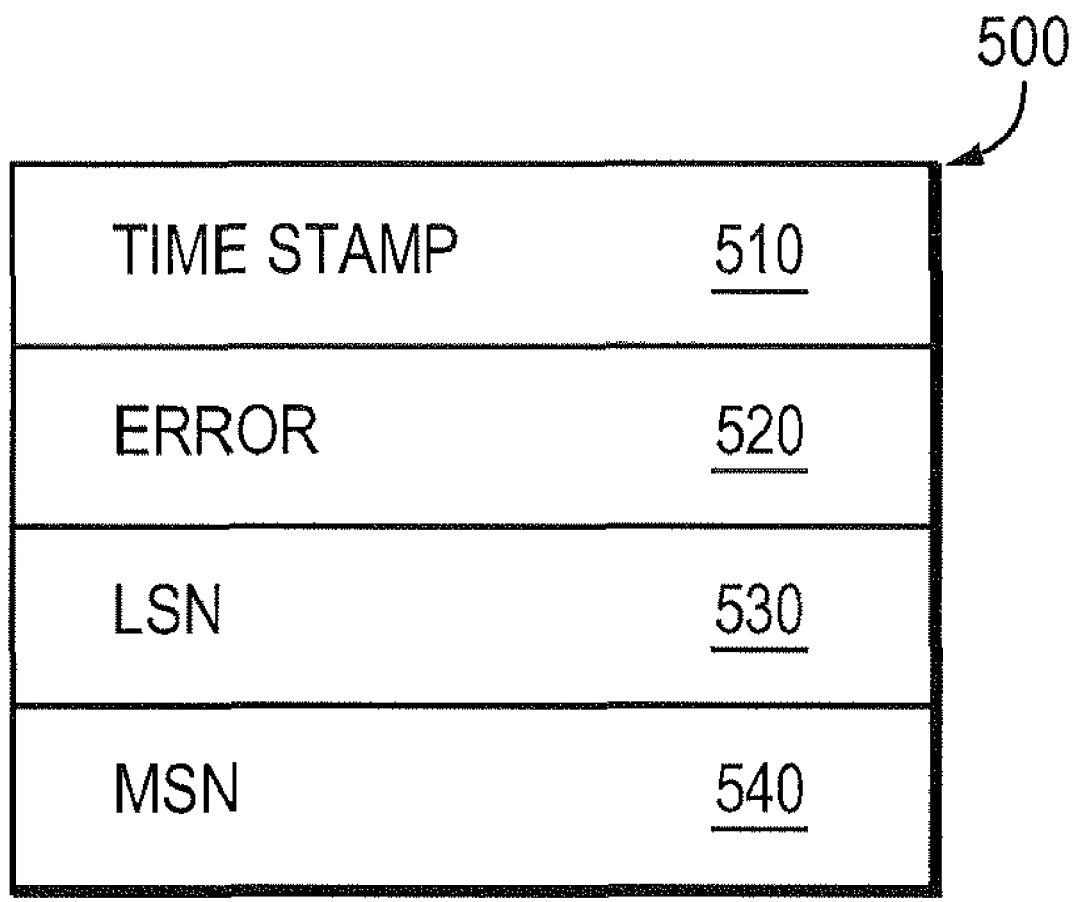
FIG. 5 is a schematic block diagram of a Time ID structure that may be advantageously used with the present invention.

FIG. 5 is a schematic block diagram of a Time ID structure 500 that may be advantageously used with the present invention. The Time ID structure 500 illustratively contains a timestamp field 510, an error field 520 (the maximum error of the timestamp), a local sequence number (LSN) field 530 and a major sequence number (MSN) field 540. The timestamp field 510 contains a timestamp, preferably chronological, with sufficient resolution (e.g., microsecond). The error field 520 contains a dynamically calculated value specifying a maximum error boundary of the timestamp. For example, assume the timestamp is t=2007, January 1 20:00:00:0000 and the error is 1000 (microseconds). An illustrative interpretation of the maximum error boundary is that the time may be lower or higher than the "correct" time in 500 microseconds, i.e., "real" time=[t−500 . . . t+500]. It will be understood to those skilled in the art that there may be other interpretations of the maximum error boundary such as, e.g., as "real" time=[t . . . t+1000], and those interpretations are covered by the present invention. The LSN field 530 contains a counter value that is incremented every time the CNode 330 is queried to return the current time and the MSN field 540 contains a counter value that increases in various low-frequency control events, such as master SRN replacement, master SRN restart, etc.

As noted, a prior solution provides consistent replication services using group stamping across multiple write interception components through the use of a conventional freeze-thaw protocol to enable coordination among all of the write interception components. In accordance with the invention, the problematic freeze-thaw protocol may be replaced with a protocol based on the loosely-accurate global clock. In particular, all SRNs 300 agree (e.g., ahead of time) on specific times (e.g., every 10 minutes, at "13:00:00", "13:10:00", "13:20:00") at which to switch from Group N to a next group, i.e., Group N+1. The SRNs maintain the loosely-accurate global clock and agree on the maximum error of the timestamp for that global clock that they consider as "acceptable", e.g., ±100 milliseconds (msec). Each SRN then behaves (operates) independently of the other SRNs, without the need for tight coordination that is inherent to the freeze-thaw protocol. For example, at 100 msec before 13:00:00 (according to its "knowledge" of the current time) each SRN 300 starts a 100 msec*2 (200 msec) "quiet" period in which it suspends processing of all new writes. Those writes will be processed as part of the next Group N+1, once the quiet period completes. As long as the global clock error of the SRNs is not greater than ±1100 msec, this grants consistency.

If, during the quiet period, a particular SRN 300 detects a global clock error greater than the maximum agreed one (e.g., ±100 msec), then that SRN does not complete Group N and refrains from switching to Group N+1 because there is a danger for consistency violation. In this case, the particular SRN 300 does not even need to introduce a quiet period; the SRN need only continue the Group N until the next agreed time (e.g., 13:10:00). Notably, the remaining SRNs need not know about the clock error of the particular SRN 300. Upon receiving all the group information, the TRN 400 detects this situation and, in response, "merges" the writes of Group N and Group N+1 received from the remaining SRNs.

Illustratively, all of the SRNs 300 transmit their buffered group entries 312 (e.g., Group N entries) to the TRN 400 via the network, wherein each group is identified by its timestamp. The TRN temporarily stores (buffers) each entry as a buffered log entry 412 in the TRN log 410 prior to applying it to the target storage space $160_T$. That is, the entries 312 transmitted from all SRNs 300 are not immediately "hardened" to the target storage space $160_T$, but instead are buffered on the TRN 400. The actual data propagation and TRN buffering implementation used the replication service 250 is independent of the present invention. However, the illustrative buffering implementation should (i) enable the entries 412 buffered on the TRN to be "logically" organized as a set of data structures, such as queues 420, e.g., one queue per SRN 300, wherein each queue 420 contains the entries 412 sorted by their order of interception at the SRN, (ii) provide the TRN 400 with the ability to conclude that up to time t, there are no other entries not yet propagated by the SRN, wherein the time t is updated frequently and denoted as T-info, and (iii) provide persistent TRN buffering for disaster recovery by, e.g., embodying the TRN log 410 as a persistent storage medium (such as a disk or non-volatile memory).

In accordance with the invention, the consistency engine 430 and apply engine 440 are illustratively software processes disposed over the virtualization system 240 (i.e., on top of the block storage) of the target storage system $200_T$, although it will be apparent to those of skill in the art that the processes could also execute in the switching fabric 140 (e.g., embodied as a software module in the network switch) or in the host 110 (e.g., embodied as a device driver). The consistency engine 430 is illustratively configured to establish and maintain a value called a consistency timeline. As described herein, the consistency timeline is established at each group interval. That is, the consistency engine decides which SRNs send groups of writes during the appropriate time interval, i.e., which groups are stamped with the same timestamp. Only TRN log entries 412 that have an associated Time ID 500 earlier than a current consistency timeline may be applied to the target storage space $160_T$ by the apply engine 440.

Once the interval is determined, i.e., the consistency timeline is established, the apply engine 440 is invoked to apply the writes of the groups to the target storage space. The apply engine 440 is thus configured to apply all log entries 412 up to an established current consistency timeline (and no more than that), to thereby create a crash image on the target storage space. As used herein, a crash image is defined as follows: given a specific timed-sequence of writes to a storage space, e.g., the source storage space, and an initial storage image, the crash image is the storage image realized if, at time t of the storage space, an interruption (e.g., power failure) occurs. The crash image is thus a storage image of the target storage space that is available at restart from an interruption, before any further writes take place.

Figure 6:
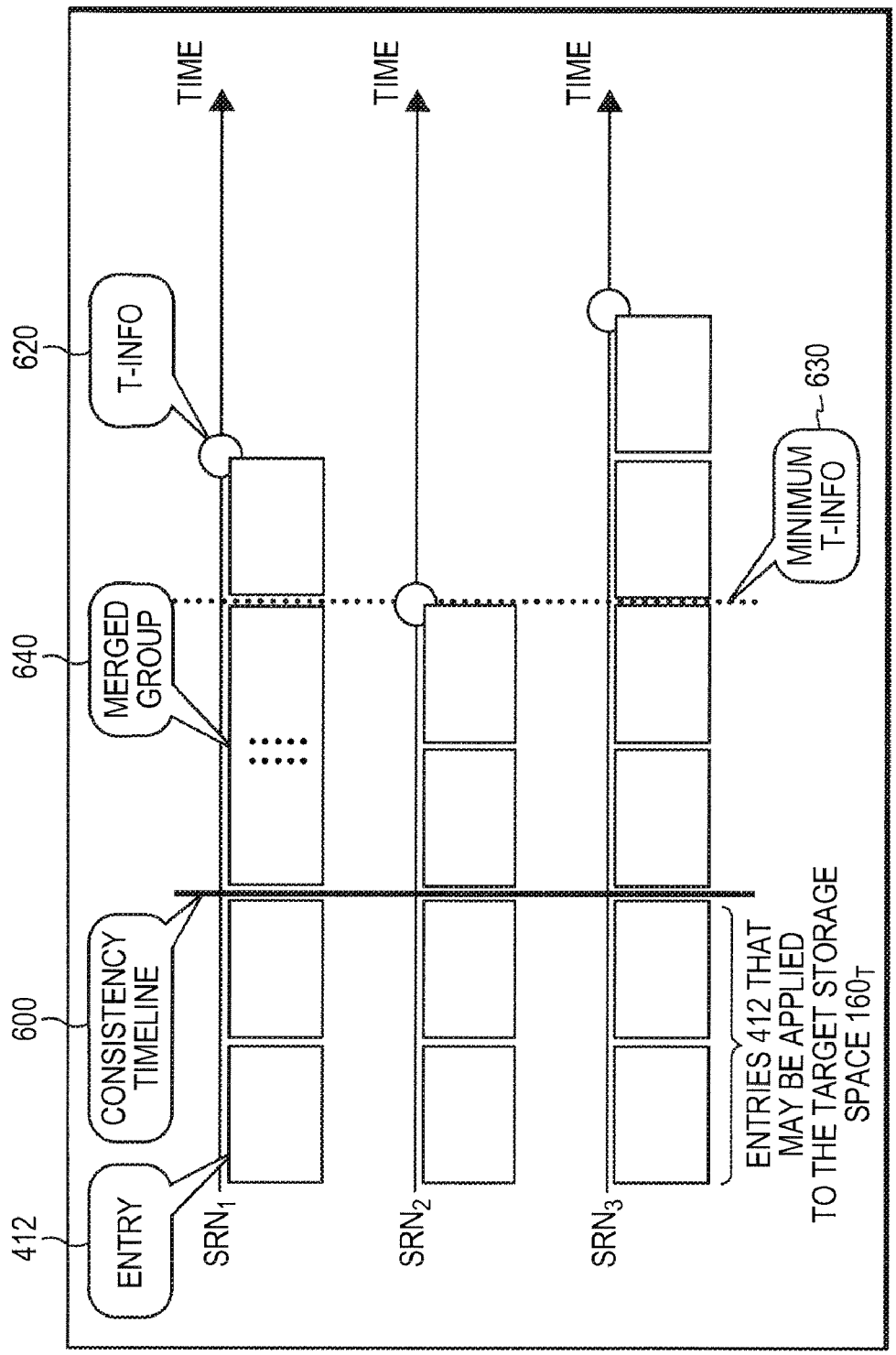
FIG. 6 is a chart depicting an illustrative embodiment of a consistency timeline that may be advantageously used with the present invention.

FIG. 6 is a chart depicting an illustrative embodiment of a consistency timeline 600 that may be advantageously used with the present invention. This figure shows entries received at the TRN 400 from write interception components of $SRN_{1-3}$. As noted, the entries are buffered (logged) upon receipt at the TRN and illustratively organized as queues, wherein each queue contains the entries 412 (i.e., groups) sorted by their order of interception at the SRNs, from the perspective of the TRN. Note the order of the groups within each queue may be guaranteed by the SRN or, alternately, the SRN may send the groups in any order and the TRN may reorder them. The specific ordering implementation is not limiting to the invention. The rectangular boxes on the timelines denote the timestamps provided by the CNodes of the SRNs for the actual entries 412 (groups).

Consistency Engine

In an illustrative embodiment, the consistency engine 430 is configured to establish, maintain and advance the consistency timeline 600, e.g., from time to time. The consistency engine 430 establishes (calculates) the timeline using parameters such as T-info 620 and Minimum T-info 630. As used herein, T-info 620 is defined as a guarantee (e.g., from a point of view of the TRN) that all entries with times earlier than T-info have been propagated by the specific SRNs associated with the specific T-info, while Minimum T-info 630 is the T-info with the lowest (earliest) value. The consistency engine 430 calculates the consistency timeline 600 in a manner that does not cause any uncertainty driven by the error boundaries of the groups.

Specifically, the goal of the consistency engine 430 is to advance the consistency timeline 600 to the most, up-to-date point possible so that the apply engine 440 can apply the groups of writes to the persistent target storage space $160_T$ UP to the calculated consistency timeline. To that end, the consistency engine 430 frequently (e.g., every 10 minutes or every time a group shipment to the TRN completes, but alternately according to policy) calculates a new consistency timeline, if possible. Typically, the desired timeline is the latest calculated timeline possible. Illustratively, groups of writes that occur earlier than the current consistency timeline (i.e., entries 412 located to the left of that consistency timeline) are allowed to be handled by the apply engine 440. The remaining entries 412 accumulate at the TRN log 410.

As noted, there may be a situation where a particular SRN 300 is not able to correctly form a current group, e.g., Group N, because of clock error and, accordingly, merges Group N with the next group, Group N+1. The consistency engine 430 detects that it has received such a merged group, e.g., merged group 640, from the SRN and, therefore, skips establishment of a consistency timeline for Group N. Note that the remaining SRNs likely will not send merged groups because they are not aware of the error with the particular SRN. The consistency engine 430 does not actually merge the groups of writes sent by all SRNs at the TRN 400, but rather just skips establishment of the consistency timeline for Group N. That is, the consistency engine skips establishment of a consistency timeline for writes sent from all SRNs for Group N.

Figure 7:
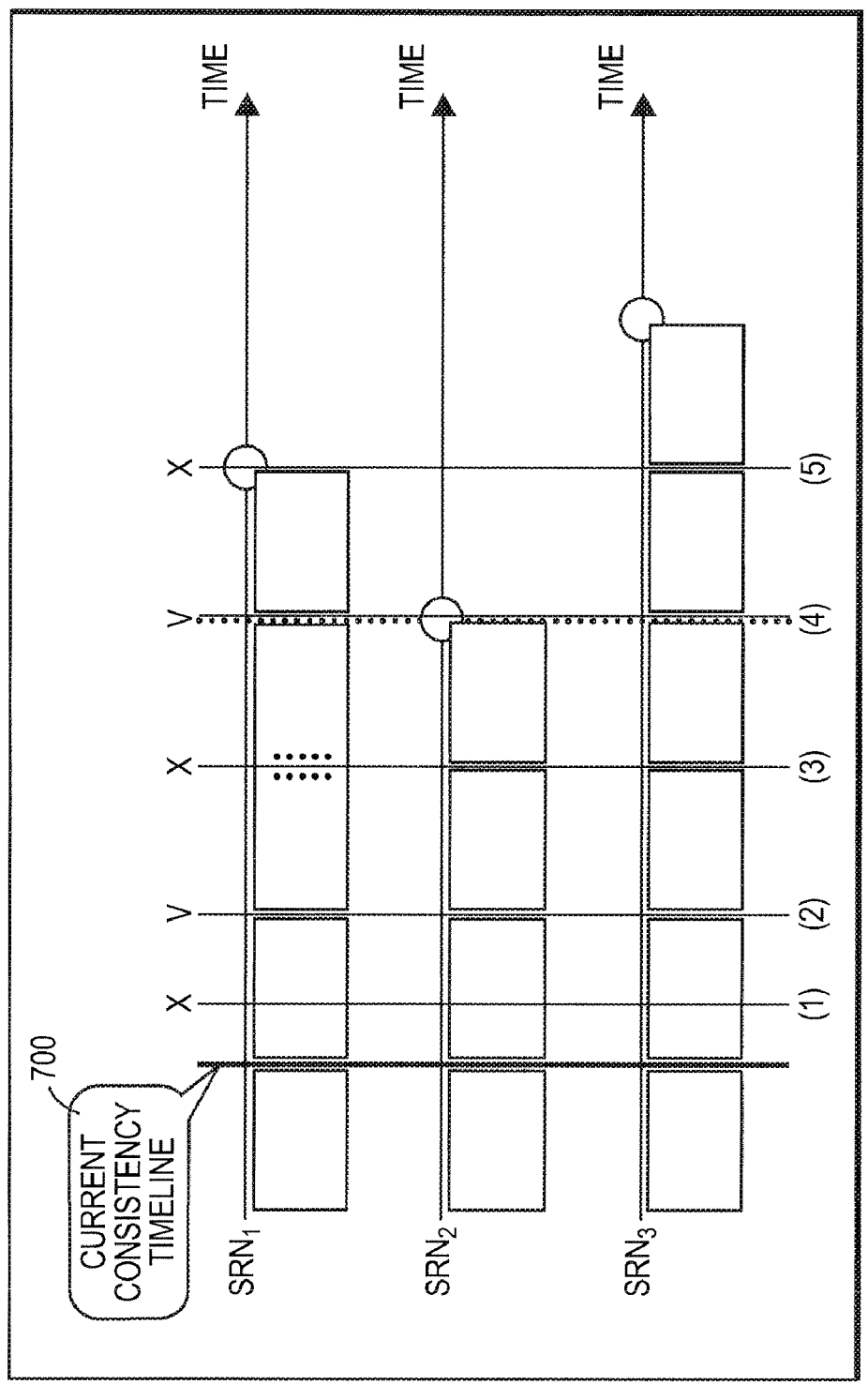
FIG. 7 is a chart depicting a set of rules used to determine the validity of consistency timeline values in accordance with the present invention.

FIG. 7 is a chart depicting a set of rules used to determine the validity of consistency timeline values in accordance with the present invention. A current consistency timeline 700 is the timeline farthest to the left of the chart. The consistency engine 430 performs its function by advancing the consistency timeline from that position. Five examples of possible new consistency timelines 1-5 are provided, along with explanations as to their validity (V) or invalidity (X), the latter signifying that such timelines are not established (drawn). Note that each possible consistency timeline is investigated independently of the others; in a practical situation involving the five possible consistency timelines, the consistency engine 430 advances the consistency timeline to the most up-to date point possible which, in this practical case, would illustratively be timeline 4.

In accordance with the invention, the consistency timeline is established at the "natural" boundary of entries 412 (groups); that is, the consistency timeline should not cross (be drawn) through the middle of any group. As can be seen, consistency timeline crosses the middle of one or more entries (groups). Therefore, timeline 1 is an invalid consistency timeline and, thus, cannot be drawn by the consistency engine 430.

Consistency timelines 2, 4 do not cross any groups (merged or otherwise) and are smaller than or equal to the Minimum T-info 630. Therefore, these timelines are valid consistency timelines and can be drawn by the consistency engine 430. In contrast, consistency timeline 3 crosses a merged group is therefore invalid. Lastly, consistency timeline 5 is invalid because it is higher than the Minimum T-info 630.

Apply Engine

The apply engine 440 is configured to apply all groups of writes (entries 412) below (i.e., to the left) or equal to the current consistency timeline 700 and then delete (erase) those entries 412 from the TRN log 410. That is, the apply engine 440 retrieves entries 412 from the queues 420 up to the current consistency timeline 700 and flushes (stores) them to the target storage space $160_T$. Concurrently, the consistently engine 430 advances the timeline to, e.g., consistency timeline 2, so that the apply engine can retrieve additional entries (up to the newly advanced current consistency timeline) and store them on the target storage space.

Assume the apply engine 440 is unable to complete storage of all entries 412 up to consistency timeline 2 because, e.g., the target storage space is slow responding to storage requests. Yet, the consistency engine 430 has advanced the current consistency timeline to, e.g., timeline 4. According to the invention, the apply engine 440 may continue processing (storing) entries 412 up to the consistency timeline 4. In other words, the progress of the apply engine (and/or target storage) does not prevent the consistency engine from continuing to calculate new consistency timelines. The apply engine 440 may apply the entries (write data of the groups) in virtually any order. That is, the apply engine does not necessarily have to apply the write data of the groups in the order that is illustrated in FIG. 6. The apply engine 440 may change the order of the groups of writes (or the order of writes within each group, if any such order exists in the specific implementation) to optimize writing to the target storage space $160_T$ as long as it does not reverse the order of two writes that address the same block.

Specifically, the apply engine 440 may apply the above writes to the target storage space $160_T$ in any order it wishes, with the following exception: if two writes, W1 and W2, are associated with overlapped storage space addresses, and are both below the current consistency timeline 700, then those writes must be applied in the "correct" time order. The motivation for this exception is that, if the two writes are directed to the same address and if their true order is altered/switched, then the result will be an old ("stale") content, rather than a desired new ("valid") content, leading to a corrupted image that is no longer a crash image. The above exception is simple to maintain and realize, as long as the SRNs 300 have shared-nothing relations to the storage space (meaning that two different SRNs cannot write to the same storage space address).

While there have been shown and described illustrative embodiments for providing a group stamping style asynchronous replication service that utilizes a loosely-accurate global clock in a data backup and recovery storage environment, it is to be understood that various other adaptations and modifications may be made within the spirit and scope of the present invention. For example, assume that a particular SRN has a clock error greater than the maximum-agreed upon error such that it merges the Group N interval with the Group N+1 interval. Assume also that the clock error persists at the SRN through interval N+1 and onto interval N+2. Note that if the system is configured correctly, then exceeding the maximum agreed error should be a temporary problem. However, if the temporary error persists, then in response to merging a number of group intervals at the TRN, user intervention is required. Other types of error scenarios are handled similarly; notably, a problem in one SRN does not affect any other SRN.

The foregoing description has been directed to specific embodiments of this invention. It will be apparent, however, that other variations and modifications may be made to the described embodiments, with the attainment of some or all of their advantages. For instance, it is expressly contemplated that the processes, modules and/or components described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for providing a group stamping style asynchronous replication service in a data backup and recovery storage environment, comprising:
   intercepting storage requests at a set of source replication nodes configured to maintain a consistency group that spans multiple geographical sites, wherein at least one of the source replication nodes comprises a storage system;
   establishing at each source replication node an interval based on a timestamp of at least one of the source replication nodes and a maximum error associated with the timestamp;
   recording the intercepted storage requests intercepted within the interval to a first group of storage requests;
   agreeing, among the source replication nodes, on times at which to switch from recording the first group of storage requests to a second group of storage requests;
   associating the first group of storage requests with the timestamp and the maximum error;
   transmitting the first group of storage requests, the timestamp and the maximum error, from the source replication nodes to one or more target replication nodes configured to service the consistency group; and
   identifying the first group of storage requests at the one or more target replication nodes using the associated timestamp.

2. The method of claim 1 wherein agreeing comprises agreeing on the maximum error of the timestamp.

3. The method of claim 2 further comprising:
   starting a quiet period at each source replication node using the maximum error and at least one of the times; and
   suspending processing of new storage requests during the quiet period.

4. The method of claim 3 further comprising:
   processing the suspended new storage requests as part of the second group of storage requests once the quiet period completes.

5. The method of claim 3 further comprising:
   detecting, during the quiet period, a global clock error greater than the maximum error at at least one source replication node;
   refraining from switching to the second group of storage requests at the at least one source replication node; and
   continuing to record the intercepted storage requests to the first group of storage requests at the at least one source replication node.

6. The method of claim 5 further comprising:
   merging the transmitted first group of storage requests with the second group of storage requests at the one or more target replication nodes.

7. A system configured to provide a group stamping style asynchronous replication service in a data backup and recovery storage environment, comprising:

a plurality of source replication nodes, at least one source replication node being a storage system, configured to cooperate and maintain a consistency group that spans multiple geographical sites, each source replication node configured to intercept storage requests, each source replication node further configured to establish an interval based on a timestamp of at least one of the source replication nodes and a maximum error associated with the timestamp, and further configured to record the intercepted storage requests intercepted within the interval to a first group of storage requests, each source replication node further configured to agree on times at which to switch from recording the first group of storage requests to a second group of storage requests, each source replication node further configured to associate the first group of storage requests with the timestamp and the maximum error; and each source replication node further configured to be coupled to one or more target replication nodes configured to service the consistency group and to identify the first group of storage requests using the associated timestamp, each source replication node further configured to transmit the first group of storage requests, the timestamp and the maximum error, to the one or more target replication nodes.

8. The system of claim 7 wherein at least one of the source replication nodes is further configured to buffer the intercepted storage requests, write data associated with the intercepted storage requests, and metadata of the first group as an entry of a buffer.

9. The system of claim 7 wherein at least one of the storage requests is a write operation.

10. The system of claim 7 wherein each of the source replication nodes is further configured to agree on the maximum error of the timestamp.

11. The system of claim 10 wherein at least one of the source replication nodes is further configured to start a quiet period using the maximum error and at least one of the times, and further configured to suspend processing of new storage requests during the quiet period.

12. The system of claim 11 wherein the at least one source replication node is further configured to process the suspended new storage requests as part of the second group of storage requests once the quiet period completes.

13. The system of claim 11 wherein, in response to detecting a global clock error greater than the maximum error during the quiet period, at least one source replication node is further configured to refrain from switching to the second group of storage requests and further configured to continue to record the intercepted storage requests to the first group of storage requests.

14. The system of claim 7 further comprising the one or more target replication nodes configured to merge the transmitted first group of storage requests with the second group of storage requests.

15. The system of claim 7 wherein at least one source replication node comprises a write interception component configured to intercept the storage requests and assign to the first group of storage requests the timestamp and the maximum error.

16. The system of claim 14 wherein the one or more target replication nodes comprise a log configured to store the transmitted first group as a log entry.

17. The system of claim 16 wherein the one or more target replication nodes further comprise a consistency engine configured to establish, maintain and advance a consistency timeline.

18. The system of claim 17 wherein the one or more target replication nodes further comprise an apply engine configured to apply the log entry to a target storage space up to the consistency timeline to create a crash image on the target storage space.

19. A computer readable storage medium containing executable program instructions executed by a processor, comprising:

program instructions that intercept storage requests at a set of source replication nodes configured to maintain a consistency group that spans multiple geographical sites, wherein at least one of the source replication nodes comprises a storage system;

program instructions that establish at each source replication node an interval based on a timestamp of at least one of the source replication nodes and a maximum error associated with the timestamp;

program instructions that record the intercepted storage requests intercepted within the interval to a first group of storage requests;

program instructions that agree, among the source replication nodes, on times at which to switch from recording the first group of storage requests to a second group of storage requests;

program instructions that associate the first group of storage requests with the timestamp and the maximum error;

program instructions that transmit the first group of storage requests, the timestamp and the maximum error, from the source replication nodes to one or more target replication nodes configured to service the consistency group; and program instructions that identify the first group of storage requests at the one or more target replication nodes using the associated timestamp.

* * * * *

UNITED STATES PATENT AND TRADEMARK OFFICE
CERTIFICATE OF CORRECTION

PATENT NO.      : 8,290,899 B2
APPLICATION NO. : 11/692683
DATED           : October 16, 2012
INVENTOR(S)     : Erez Webman et al.

It is certified that error appears in the above-identified patent and that said Letters Patent is hereby corrected as shown below:

Col. 1, line 15 should read: "on Oct. 2, ~~2006~~2008 as Patent Publication No. 2008/0243951, each"

Col. 10, line 14 should read: "the timestamp is t = 2007, ~~January~~ 1 20:00:00:0000"

Col. 12, line 14 should read: "groups of writes to the persistent target storage space $160_T$ ~~UP~~up"

Col. 14, line 57 should read: "greater than the maximum error ~~at~~ at least one source"

Signed and Sealed this
First Day of January, 2013

David J. Kappos
*Director of the United States Patent and Trademark Office*